R. E. HELLMUND.
SYSTEM OF CONTROL.
APPLICATION FILED AUG. 7, 1914.

1,320,047.

Patented Oct. 28, 1919.
2 SHEETS—SHEET 1.

WITNESSES:
W. S. Reece
R. J. Fitzgerald

INVENTOR
Rudolf E. Hellmund
BY
Wesley G. Carr
ATTORNEY

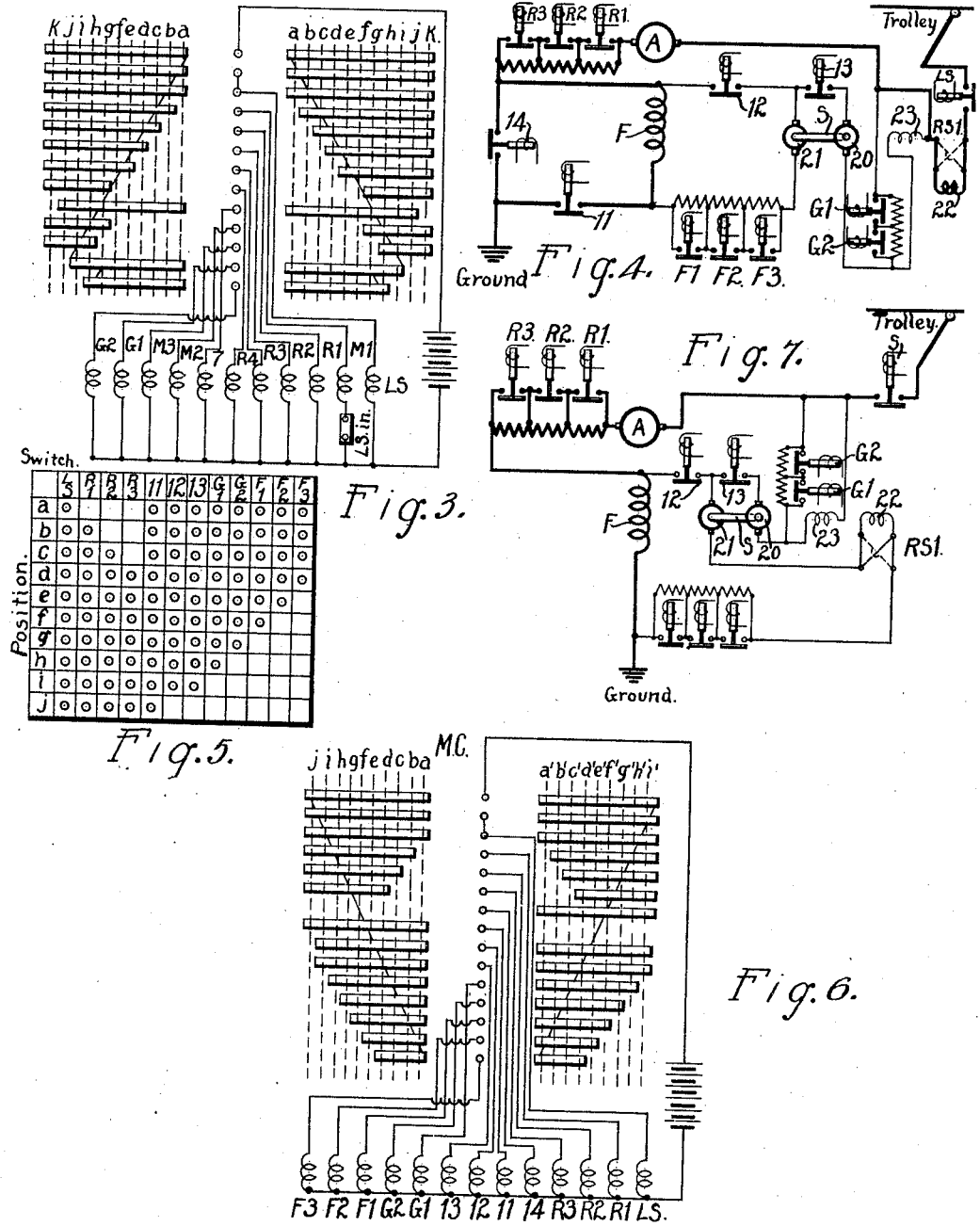

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,320,047.   Specification of Letters Patent.   Patented Oct. 28, 1919.

Application filed August 7, 1914. Serial No. 855,539.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Control, of which the following is a specification.

My invention relates to systems of control for dynamo-electric machines, and it has special reference to the regenerative control of electric motors that are adapted for use in propelling electric railway vehicles and the like.

One object of my invention is to provide simple, durable, and reliable means for effecting regenerative operation of the momentum-driven armatures of motors of the above-indicated character, whereby a certain proportion of the energy absorbed during the propelling period is returned to the supply circuit, to reduce operating expenses, and whereby various other well-known operating advantages are secured.

Another object of my invention is to provide a system of regenerative control which shall embody means for automatically compensating for the unavoidable voltage fluctuations in the supply-circuit voltage whereby a substantially constant regenerated current is maintained during such fluctuations.

More specifically stated, an object of my invention is to provide a motor-generator set or dynamotor of relatively small capacity for variably energizing the main series field magnet winding of the propelling motor or motors during regenerative operation. The set may be driven either from a predetermined portion of the regenerative circuit or from a suitable external source of energy.

Figure 1:
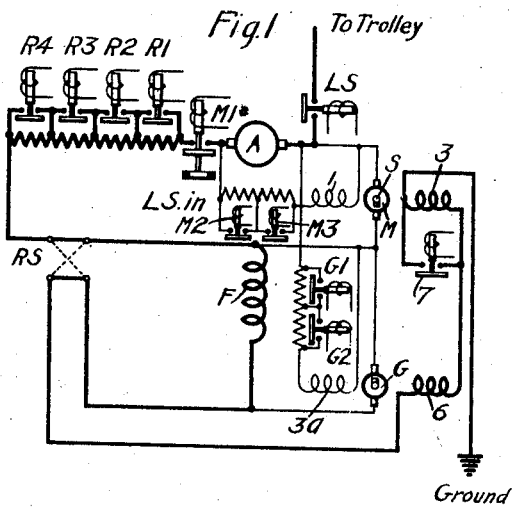
Figure 2:
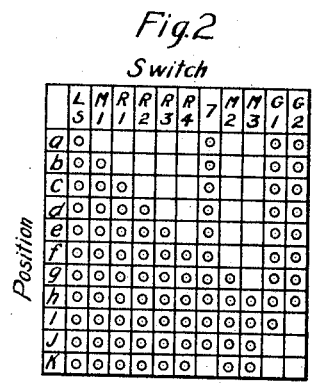
Figure 8:
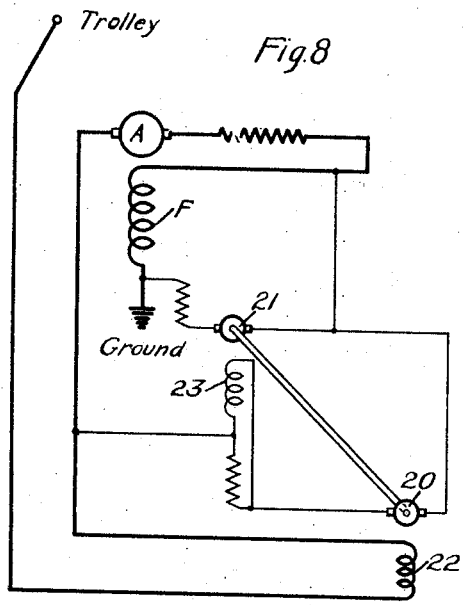
Figure 9:
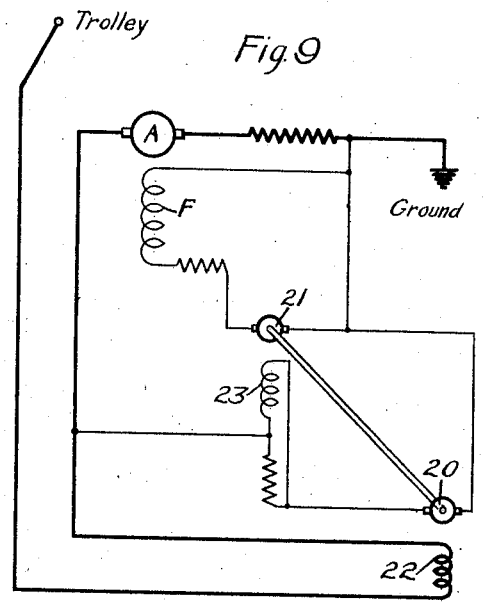

The various novel circuit arrangements and connections employed in my invention may best be understood by reference to the accompanying drawings, in which Figure 1 is a diagrammatic view of the main circuit connections of a control system embodying my invention; Fig. 2 is a chart, of well-known form, indicating the sequence of operation of the various motor-controlling switches shown in Fig. 1; Fig. 3 is a diagrammatic view of an auxiliary control system for operating the system of Fig. 1 in accordance with the chart, Fig. 2; Figs. 4, 5 and 6 are views corresponding, respectively, to Figs. 1, 2 and 3 of a modified system of my invention; Fig. 7 is a view similar to Fig. 4 and illustrates a modification of what is shown therein; and Figs. 8 and 9 are simplified diagrammatic views of the circuits completed in the modification shown in Fig. 4.

Like reference characters designate like parts in all of the figures.

Referring to Fig. 1 of the drawings, the system shown is adapted for "field control" and regeneration without employing a battery, or other external source. This result is accomplished by connecting the driving motor of a small motor-generator set across the armature circuit of one or more of the main motors, while the driven generator or exciter is connected to energize the main series field windings.

The system comprises a suitable supply circuit, including conductors "Trolley" and "Ground"; a main motor armature A and series field winding F; a main circuit resistor, the sections of which are adapted to be respectively short-circuited by switches R1, R2, R3 and R4; a small motor-generator set having the armature of its motor M connected across the series-connected main motor armature A and the said main circuit resistor, and the generator G connected to energize its main field winding F; a reversing switch RS for reversing the connections of the field winding F with respect to the armature A, and motor-controlling switches LS, M1 and 7.

The motor M is provided with a main circuit series field winding 3, and with a shunt field winding 1 that is connected in series relation with a resistor, the sections of which are adapted to be respectively short-circuited by switches M2 and M3, across the main armature A. The generator G is provided with a main circuit series field winding 6 and with a shunt field winding $3_a$ that is connected in series-circuit relation with a resistor, the sections of which are adapted to be respectively short-circuited by switches G1 and G2, across the armature A and the main circuit resistor, that is, in parallel relation to the armature of the small motor M, although the generator may be self-excited, if desired. The switch M1 is electrically interlocked with the switch LS, in such manner that the switch M1 cannot be closed with switch LS open, as shown by the position of interlock marked "LS in", in Fig. 3.

As indicated in the sequence chart of Fig.

2 and in the auxiliary control system of a familiar type that is shown in Fig. 3, acceleration of the motor is effected by initially progressively short-circuiting the main circuit resistors; then strengthening the field flux of the motor M by successively closing the switch M2 and M3, whereby the speed of the motor-generator set is decreased, and the current delivered by the generator G to the series field winding F is correspondingly decreased; then successively opening the generator field-circuit switches G2 and G1, and finally opening the series field short-circuiting switch 7, to likewise cause predetermined decreases in the main field current.

For regeneration, the reversing switch RS is preferably thrown to the reverse position, and the steps employed during acceleration are duplicated, as indicated in Fig. 3.

Reference may now be had to Fig. 4, which illustrates the embodiment of a dynamotor of well-known construction in my invention.

The system shown comprises a suitable supply circuit, a main motor having the armature A and the field winding F; a dynamotor having a motor armature winding 20, a generator armature 21, a series field winding 22 for the armature 20, and a field winding 23 for the armature 21 that is energized by a predetermined portion of the driving current for the dynamotor; a main-circuit resistor, the sections of which are adapted to be respectively short-circuited by switches R1, R2 and R3; a second resistor that is connected, in series relation with the generator armature 21, across the field winding F, and the sections of which are adapted to be respectively short-circuited by switches F1, F2 and F3; a third resistor that is connected in parallel relation to the field winding 23, and the sections of which are adapted to be respectively short-circuited by switches G1 and G2; a plurality of motor-controlling switches LS, 11, 12, 13 and 14; and a reversing switch RS1 for reversing the field winding 22.

The motor armature 20 is thus connected across the armature A and the first and third resistors mentioned above, while the motor field winding 22 is connected in series relation with the main motor. The generator armature 21 is connected to energize the main field winding F. It will be understood that, in the preferred type of dynamotor, the windings 22 and 23 are disposed on the same polar projections; consequently, each field winding influences both armatures 20 and 21.

As indicated in the sequence chart of Fig. 5, and in the auxiliary control system of a familiar type that is illustrated in Fig. 6, acceleration of the motor is effected by initially successively closing switches R1, R2 and R3, thus reducing the main circuit resistance; then successively opening the switches F3, F2, and F1, thereby decreasing the excitation of the series field winding F; then opening the switches G2 and G1 to increase the field strength of the dynamotor, thus decreasing its speed and, consequently, again reducing the excitation of the field winding F; and finally opening switches 12 and 13, thereby interrupting the connection between the generator armature 21 and the field winding F, and also interrupting the supply of energy to the dynamotor. Each further weakening of the main motor excitation causes a corresponding increase of motor speed. The circuit completed through the motor during acceleration of the motor is diagrammatically illustrated in Fig. 8 of the drawing.

During regeneration, the field winding 22 is reversed, the switch 11 is opened, and the switch 14 is closed. The field winding F is thus excited wholly by the generator armature 21. The remaining regenerative steps otherwise duplicate the steps employed during acceleration, with the exception that the final position $j$ of the accelerating side of the master controller MC, is omitted from the regenerative portion thereof, as shown in Fig. 6.

For regenerative operation, the system is entirely automatic in so far as compensation for supply circuit voltage fluctuations is concerned. The reversal of the field winding 22 causes a differential or opposing action between the regenerated-current-excited field winding 22 and the field winding 23. Assuming that the supply-circuit voltage suddenly decreases, the regenerated current will correspondingly increase, as hereinbefore set forth. The increased excitation of the field winding 22 tends to demagnetize the field of the dynamotor, but, inasmuch as the dynamotor speed will not change instantaneously on account of the inertia of the rotating parts, the voltage of the generator armature 21, and, therefore, the excitation of the series field winding F, will decrease, thereby effecting a decrease in the regenerated current. In the meantime, the speed of the dynamotor adjusts itself to the new value of field flux, but, since the voltage of the main motor armature A has already been reduced, the voltages of the two armatures are permanently reduced in proportion to the decrease in supply-circuit voltage. It will be understood that a reversed action occurs upon a decrease in supply-circuit voltage when the main motor is accelerating, except in the final running position, when the motor is operating as a straight series motor. The circuit completed through the motor during regenerative operation is diagrammatically illustrated in Fig. 9 of the drawing.

Fig. 7 illustrates a system that is quite similar to that shown in Fig. 4. The points of difference are: The field winding 22 is connected in series-circuit relation with the small motor armature 21 instead of in series relation with the main motor armature A, and the switches 11 and 14 are omitted. It is believed that the regenerative operation of the system will be readily understood by a comparison with the system of Fig. 4. The system under consideration is also well adapted for preventing "flash-over" conditions, as set forth in my hereinbefore identified co-pending application. It will be observed that the series field winding F remains in the main motor circuit during regeneration, and is thus partially excited by the regenerated current.

I desire it to be understood that various modifications in the circuit connections and arrangement of parts herein set forth may be made within the spirit and scope of my invention. For example, either a motor-generator set or a dynamotor may be employed under various operating conditions to achieve the benefits of my invention to a greater or lesser extent. I desire, therefore, that only such limitations shall be imposed as are indicated in the appended claims.

I claim as my invention:

1. In a system of control, the combination with a supply circuit, and a momentum-driven armature of a dynamo-electric machine having a field magnet winding, of a plurality of mechanically-connected auxiliary armature windings arranged to energize said field winding during regeneration, at least one of said armature windings being provided with a field magnet winding energized by a predetermined portion of the driving current for said armature windings and a differentially-wound field magnet winding energized by a predetermined portion of the regenerated current, for automatically maintaining a substantially constant value of said current as the supply-circuit voltage fluctuates.

2. In a system of control, the combination with a supply circuit, and a momentum-driven armature of a dynamo-electric machine having a field magnet winding, of a plurality of auxiliary mechanically-connected armature windings respectively connected to variably energize said field winding during regeneration and connected across a predetermined portion of the regenerative circuit.

3. In a system of control, the combination with a supply circuit, and a main dynamo-electric machine having an armature and a field winding, of a dynamotor for normally receiving the supply-circuit voltage and delivering a different voltage to said field winding, said dynamotor having a field winding energized in accordance with the main armature current, and means for varying the proportion of the total dynamotor excitation that is supplied by said field winding.

4. In a system of control, the combination with a supply circuit, and a momentum-driven armature of a dynamo-electric machine having a field magnet winding, of a plurality of mechanically-connected auxiliary armature windings arranged to energize said field winding during regeneration, at least one of said armature windings being provided with a field magnet winding energized in accordance with the driving current for said armature windings.

5. In a system of control, the combination with a supply circuit, and a momentum-driven armature of a dynamo-electric machine having a field magnet winding, of a plurality of mechanically-connected auxiliary armature windings arranged to energize said field winding during regeneration, and an arrangement of field windings for affecting both auxiliary armature windings by the load current thereof and for affecting at least one auxiliary winding by the regenerated current.

6. In a system of control, the combination with a supply circuit, and a momentum-driven armature of a dynamo-electric machine having a field magnet winding, of a plurality of mechanically-connected auxiliary armature windings arranged to energize said field winding during regeneration, field-coils energized in accordance with the load current of said auxiliary armature windings for exciting both of said windings in like manner, and field-coils energized in accordance with the regenerated current for exciting at least one of said windings.

7. In a system of control, the combination with a supply circuit, and a momentum-driven armature of a dynamo-electric machine having a field magnet winding, of a dynamotor having a driving armature winding and having a generator armature winding connected to energize said field winding during regeneration, a field winding for said dynamotor energized in accordance with the load current thereof, and a differentially-wound field winding for said dynamotor energized in accordance with the regenerated current.

8. In a system of control, the combination with a supply circuit, and a momentum-driven armature of a dynamo-electric machine having a field magnet winding, of a main-circuit resistor, and a plurality of auxiliary mechanically-connected armature windings respectively connected to variably energize said field winding during regeneration and connected across the main armature and said resistor.

9. In a system of control, the combination with a supply circuit, and a momentum-driven armature of a dynamo-electric machine having a field magnet winding, of a main-circuit resistor, a plurality of auxiliary mechanically-connected armature windings respectively connected to variably energize said field winding during regeneration and connected across the main armature and said resistor, field-coils energized in accordance with the load current of said auxiliary armature windings for exciting both of said windings, and field-coils energized in accordance with the regenerated current for exciting at least one of said windings.

10. In a system of control, the combination with a supply circuit, and a main dynamo-electric machine having an armature and a field winding, of a dynamotor for normally receiving the supply-circuit voltage and delivering a different voltage to said field winding, said dynamotor having a field winding energized in accordance with the main armature current and a second field winding differentially energized in accordance with the dynamotor load current, and means for varying the differential effect of said second field winding.

In testimony whereof, I have hereunto subscribed my name this 31 day of July 1914.

RUDOLF E. HELLMUND.

Witnesses:
W. A. CLARK,
B. B. HINES.

Copies of this patent may be obtained for five cents each, by addressing the "Commissioner of Patents, Washington, D. C."